United States Patent
Park et al.

(10) Patent No.: US 7,813,435 B2
(45) Date of Patent: Oct. 12, 2010

(54) CARRIER ALLOCATION METHOD IN OFDM SYSTEM AND TRANSMITTING APPARATUS USING THE METHOD

(75) Inventors: Hyeong-Sook Park, Daejeon (KR); Youn-Ok Park, Daejeon (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 669 days.

(21) Appl. No.: 11/722,028

(22) PCT Filed: May 11, 2005

(86) PCT No.: PCT/KR2005/001380

§ 371 (c)(1),
(2), (4) Date: Jun. 18, 2007

(87) PCT Pub. No.: WO2006/068349

PCT Pub. Date: Jun. 29, 2006

(65) Prior Publication Data

US 2008/0205532 A1 Aug. 28, 2008

(30) Foreign Application Priority Data

Dec. 20, 2004 (KR) .................... 10-2004-0109005

(51) Int. Cl.
*H04K 1/10* (2006.01)
(52) U.S. Cl. ...................................... 375/260; 370/208
(58) Field of Classification Search .............. 375/260; 455/59; 370/203, 206–210
See application file for complete search history.

(56) References Cited

U.S. PATENT DOCUMENTS

2006/0008014 A1* 1/2006 Tamaki et al. ............... 375/260

FOREIGN PATENT DOCUMENTS

KR  1020030070218 A   8/2003
WO  2004077777 A1   9/2004

OTHER PUBLICATIONS

A Real-time Sub-carrier Allocation Scheme for Multiple Access Downlink OFDM Transmission—Cheong Yui Wong, et al.,, pp. 1124-1129, IEEE, 1999.
"Multiuser subcarrier allocation for OFDM transmission using adaptive modulation"—Cheong Yui Wong, et al., pp. 479-483, May 16-20, 1999, IEEE 49th Houston Veh. Tech. Conf.
"Multiuser subcarrier allocation for QoS provision in the OFDMA systems"—Pietrzyk, S., et al, IEEE 56th, Veh. Tech. conf. Sep. 2002, pp. 1077-1081.

* cited by examiner

*Primary Examiner*—Kevin Y Kim
(74) *Attorney, Agent, or Firm*—Jefferson IP Law, LLP

(57) ABSTRACT

The present invention relates to a method for allocating subcarriers in an orthogonal frequency division multiplex (OFDM) system, and a transmitter thereof. In the OFDM system according to an exemplary embodiment of the present invention, the subcarrier allocation is performed in the buffer (10) before a modulation mapping operation is performed according to a modulation method such that the delay may not be generated in the subchannel formed on the symbol axis. The delay corresponding to the symbols is prevented without using any additional hardware for eliminating the delay generated when the subcarriers are allocated to the subchannel formed on the symbol axis.

10 Claims, 4 Drawing Sheets

[Fig. 1]
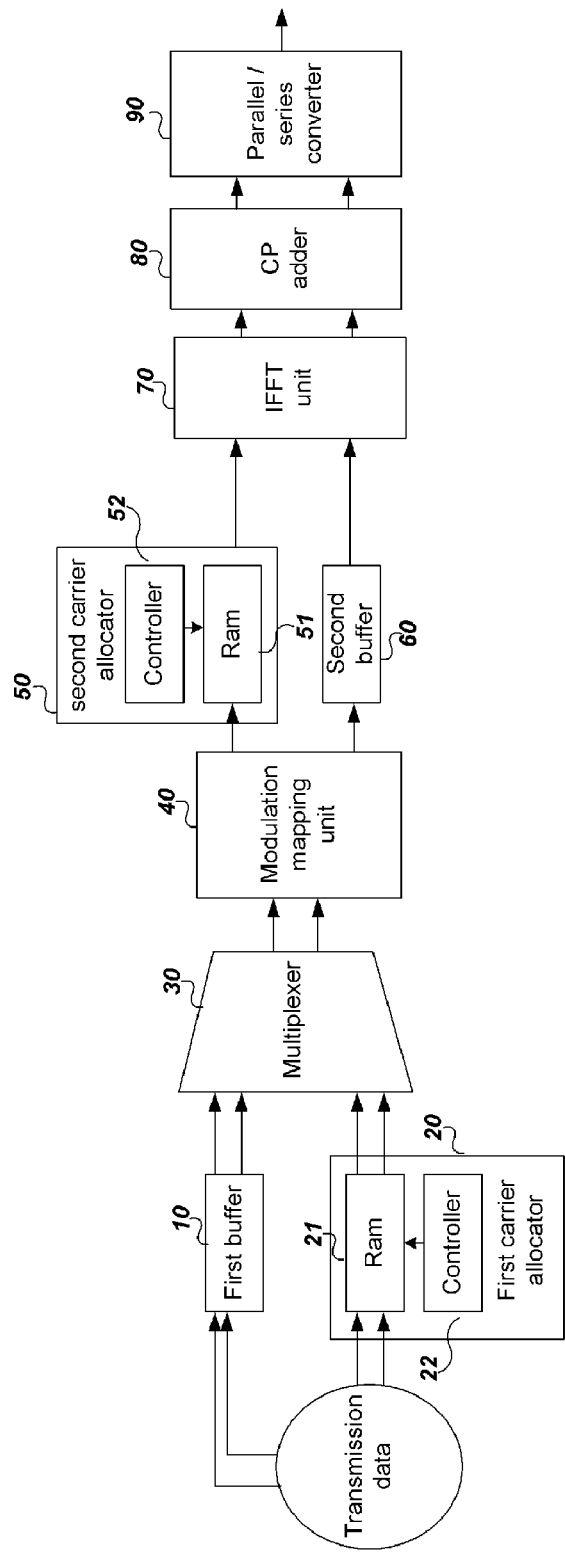

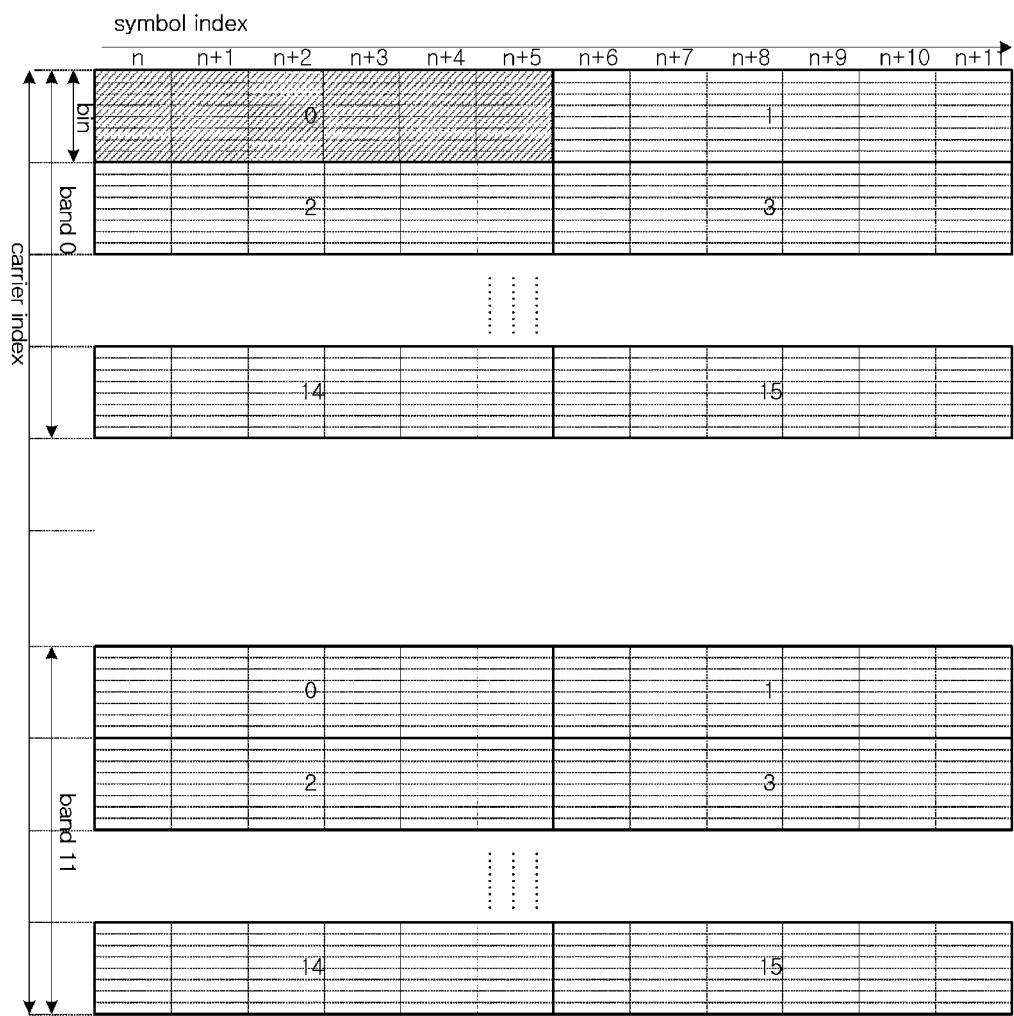
[Fig. 2]

[Fig. 3]
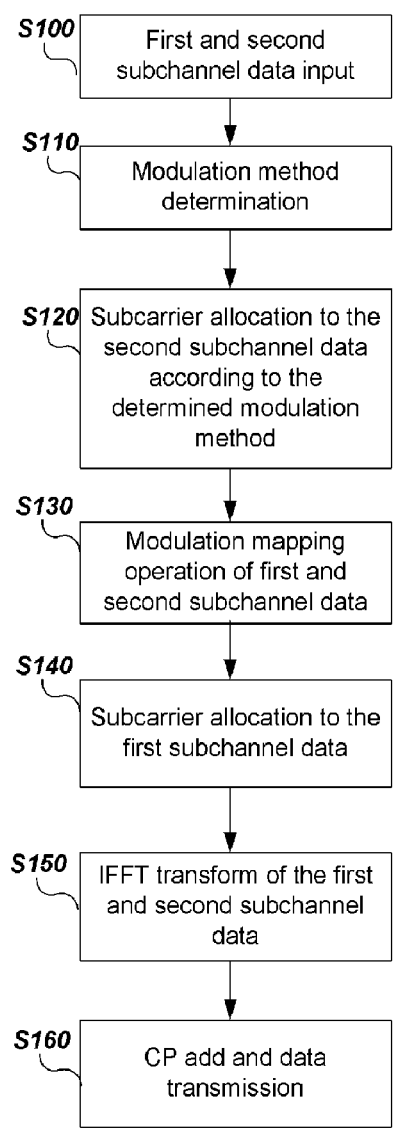

[Fig. 4]

| 0 | 8 | 16 | 24 | 32 | 40 |
|---|---|---|---|---|---|
|  | 9 | 17 |  | 33 | 41 |
| 1 | 10 | 18 | 25 | 34 | 42 |
| 2 | 11 | 19 | 26 | 35 | 43 |
| 3 |  | 20 | 27 |  | 44 |
| 4 | 12 | 21 | 28 | 36 | 45 |
| 5 | 13 | 22 | 29 | 37 | 46 |
| 6 | 14 |  | 30 | 38 |  |
| 7 | 15 | 23 | 31 | 39 | 47 |

(a)

| 15 | 23 | 7 | 39 | 31 | 47 |
|---|---|---|---|---|---|
|  | 43 | 16 |  | 11 | 38 |
| 33 | 30 | 42 | 21 | 24 | 12 |
| 36 | 44 | 14 | 18 | 10 | 40 |
| 29 |  | 17 | 25 |  | 37 |
| 28 | 46 | 9 | 26 |  | 45 |
| 19 | 22 | 41 | 35 | 32 | 6 |
| 34 | 27 |  | 13 | 20 |  |
| 4 | 3 | 5 | 1 | 2 | 0 |

(b)

| 47 | 36 | 17 | 34 | 37 | 43 |
|---|---|---|---|---|---|
|  | 21 | 20 |  | 1 | 22 |
| 31 | 35 | 26 | 27 | 6 | 18 |
| 39 | 33 | 5 | 28 | 29 | 9 |
| 15 |  | 38 | 14 |  | 11 |
| 7 | 42 | 25 | 4 | 2 | 45 |
| 23 | 30 | 13 | 3 | 44 | 12 |
| 46 | 19 |  | 10 | 41 |  |
| 16 | 0 | 8 | 32 | 24 | 40 |

(c)

| 94,95 | 72,73 | 34,35 | 68,69 | 74,75 | 86,87 |
|---|---|---|---|---|---|
|  | 42,43 | 40,41 |  | 2,3 | 44,45 |
| 62,63 | 70,71 | 52,53 | 54,55 | 12,13 | 36,37 |
| 78,79 | 66,67 | 10,11 | 56,57 | 58,59 | 18,19 |
| 30,31 |  | 76,77 | 28,29 |  | 22,23 |
| 14,15 | 84,85 | 50,51 | 8,9 | 4,5 | 90,91 |
| 46,47 | 60,61 | 26,27 | 6,7 | 88,89 | 24,25 |
| 92,93 | 38,39 |  | 20,21 | 82,83 |  |
| 32,33 | 0,1 | 16,17 | 64,65 | 48,49 | 80,81 |

(d)

| 141,142,143 | 108,109,110 | 51,52,53 | 102,103,104 | 111,112,113 | 129,130,131 |
|---|---|---|---|---|---|
|  | 63,64,65 | 60,61,62 |  | 3,4,5 | 66,67,68 |
| 93,94,95 | 105,106,107 | 78,79,80 | 81,82,83 | 18,19,20 | 54,55,56 |
| 117,118,119 | 99,100,101 | 15,16,17 | 84,85,86 | 87,88,89 | 27,28,29 |
| 45,46,47 |  | 114,115,116 | 42,43,44 |  | 33,34,35 |
| 21,22,23 | 126,127,128 | 75,76,77 | 12,13,14 | 6,7,8 | 135,136,137 |
| 69,70,71 | 90,91,92 | 39,40,41 | 9,10,11 | 132,133,134 | 36,37,38 |
| 138,139,140 | 57,58,59 |  | 30,31,32 | 123,124,125 |  |
| 48,49,50 | 0,1,2 | 24,25,26 | 96,97,98 | 72,73,74 | 120,121,122 |

(e)

CARRIER ALLOCATION METHOD IN OFDM SYSTEM AND TRANSMITTING APPARATUS USING THE METHOD

TECHNICAL FIELD

The present invention relates to an orthogonal frequency division multiplex (OFDM) system. More specifically, the present invention relates to a method for allocating subcarriers when a subchannel is formed on a symbol axis in the OFDM system, and a transmission device thereof.

BACKGROUND ART

For the purpose of realizing a wireless broadband multimedia system for providing a high reliability and a large scale service, an OFDM transmission scheme has been highly regarded since the OFDM transmission scheme allows a signal to be transmitted at a high data rate in a millimeter-wave bandwidth ranging from several GHz to tens of GHz.

The OFDM scheme is one of several frequency multiplex schemes. In the OFDM, data to be transmitted are inverse-Fourier-transformed, and a bandwidth is divided into a plurality of subcarriers to be transmitted; and the transmitted subcarriers are fast-Fourier transformed to transform the subcarriers into the original data in a receiver. Also, a predetermined orthogonal condition is provided to the subcarrier frequencies so as to respectively divide the subcarriers across the spectrum.

Generally, a transmitter of the OFDM system converts data to be transmitted into parallel data, modulates the respective parallel data, performs an inverse-fast Fourier transform of the modulated data, outputs the inverse-fast Fourier transformed data as time domain signals, converts the data into serial signals, and transmits the data.

A receiver then converts the received signals into digital parallel signals, performs a fast-Fourier transform of time-domain data of the parallel data to convert the same into frequency-domain data, estimates a channel estimate of the frequency domain data, and demodulates the data with reference to the channel estimate.

In the OFDM system, when subchannels formed on the time domain which is a symbol axis coexist with subchannels formed on the frequency domain in a frame, the data are allocated for each subchannel in order to perform data burst allocation of the two types of subchannels, and data of a corresponding symbol are mixed according to a subcarrier allocation algorithm. This process is performed by a previous unit of an inverse-Fourier transform unit while using a buffer corresponding to a symbol size.

When the subcarrier allocation to the subchannel formed on the symbol axis is performed for each N number of symbols, a delay corresponding to the N symbols is generated. Accordingly, the delay corresponding to the N symbols affects a system when a carrier allocator for allocating the subchannels for each N number of symbols is applied in the time division duplexing (TDD) scheme.

In addition, when the delay is generated by allocating the subcarrier to subchannel formed on the symbol axis, additional buffers are required such that a time delay corresponding to the above-noted delay may be generated for the subchannel formed on the frequency domain.

DISCLOSURE OF INVENTION

Technical Problem

It is an advantage of the present invention to provide a transmitter of an OFDM system for preventing the delay of N symbols without using any additional hardware when the subcarriers are allocated to the subchannel formed on the symbol domain.

Technical Solution

The present invention discloses a method for allocating subcarriers in an OFDM system. In the method, a) transmission data are classified into data of a first subchannel formed on a frequency domain and data of a second subchannel formed on a symbol axis; b) the subcarriers are allocated to the data of the second subchannel; c) the data of the first subchannel and the subcarrier-allocated data of the second subchannel are mapped according to respective modulation methods; and d) the subcarriers are allocated to the modulation-mapped data of the first subchannel.

The present invention also discloses a transmitter of an OFDM system. The transmitter includes a first carrier allocator for receiving first data of a subchannel formed on a symbol axis and allocating subcarriers to the first data; a modulation mapper for mapping the subcarrier-allocated first data according to a modulation method; an inverse fast-Fourier transform unit for performing an inverse fast-Fourier transform of the demodulated first data, and outputting the OFDM symbol-based data; and a transmission unit for adding a cyclic prefix to the OFDM symbol based first data and transmitting the data.

Advantageous Effects

In an OFDM system according to an exemplary embodiment of the present invention, subcarrier allocation is performed in a buffer for converting data inputted according to burst timing to data according to modulation timing when subchannels formed on the time domain which is a symbol axis coexist with subchannels formed on the frequency domain in a frame. The subcarrier allocation is performed in the buffer before a modulation mapping operation is performed according to a modulation method such that the delay may not be generated in the subchannel formed on the symbol axis.

The delay of N symbols is prevented without using any additional hardware for eliminating the delay generated when the subcarriers are allocated to the subchannel formed on the symbol axis.

BRIEF DESCRIPTION OF THE DRAWINGS

FIG. 1 shows a block diagram representing a transmitter of the OFDM system according to exemplary embodiment of the present invention.

FIG. 2 shows a diagram for exemplifying symbols of the second subchannel, the respective subchannels including 6 symbols in the OFDM system.

FIG. 3 shows a flow chart for representing a subcarrier allocation process according to the exemplary embodiment of the present invention.

FIG. 4 shows a diagram for representing the process for allocating the subcarrier to one subchannel of the symbol axis subchannels.

BEST MODE FOR CARRYING OUT THE INVENTION

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention.

Accordingly, the drawings and description are to be regarded as illustrative in nature, and not restrictive. To clarify the present invention, parts which are not described in the specification are omitted, and parts for which similar descriptions are provided have the same reference numerals.

FIG. 1 shows a block diagram for representing a transmitter of the OFDM system according to an exemplary embodiment of the present invention.

As shown in FIG. 1, the transmitter of the OFDM system includes a first buffer 10, a first carrier allocator 20, a multiplexer 30, a modulation mapper 40, a second carrier allocator 50, a second buffer 60, an inverse fast-Fourier transform (IFFT) unit 70, a cyclic prefix unit (CP) adder 80, and a parallel/series converter 90. The CP adder and parallel/series converter 90 may be combined to be referred to as a transmission unit.

Transmission data to be transmitted are inputted as a burst, classified into data of the subchannel formed on the frequency domain (hereinafter referred to as a first subchannel) and data of the subchannel formed on the symbol axis (hereinafter referred to as a second subchannel), and inputted to the first buffer 10 and the first carrier allocator 20.

The first buffer 10 includes a random access memory (RAM) for temporally storing the data of the first subchannel and outputting the data as OFDM symbols.

As shown in FIG. 1, the first carrier allocator 20 includes a RAM 21 for storing input data, and a controller 22 for reading the data stored in the RAM 21 in an order according to a predetermined carrier allocation algorithm to allocate a corresponding carrier. The first carrier allocator 20 respectively allocates subcarriers to the data of the second subchannel.

The multiplexer 30 outputs the data outputted from the first buffer 10 and the first carrier allocator 20 to the modulation mapper 40. The modulation mapper 40 modulates the applied data in a modulation method for data transmission, and outputs the modulated data. Generally, binary phase shift keying (BPSK), quaternary phase shift keying (QPSK), 16 quadrature amplitude modulation (QAM), and 64 QAM are used in the IEEE 802.11a. In a period, 1 bit of data is transmitted in the BPSK, 2 bits of data are transmitted in the QPSK, 4 bits of data are transmitted in the 16 QAM, and 6 bits of data are transmitted in the 64 QAM.

The second carrier allocator 50 includes a RAM 51 for storing the input data, and a controller 52 for reading the data stored in the RAM 51 in an order of the pre-determined carrier allocation algorithm to allocate a corresponding subcarrier. The second carrier allocator 50 respectively allocates the subcarriers to the data of the first subchannel modulated and outputted by the modulation mapper 40.

The second buffer 60 buffers the data of the second subchannel modulated and outputted by the modulation mapper 40.

The data from the second carrier allocator 50 and the second buffer 60 are input to the IFFT unit 70, and the IFFT unit 70 converts the modulated and applied data into time domain signals and outputs the signals. That is, the subcarriers are allocated to the respective data, and the respective data are inverse-fast-Fourier transformed, placed on the subcarriers having orthogonality in the frequency domain, and converted into the time domain signals for practically being transmitted. At this time, the data from the IFFT unit 150 is referred to as an OFDM symbol.

The CP adder 80 adds a cyclic prefix to the respective OFDM symbol-based data. The cyclic prefix is added by establishing a guard interval to be longer than a maximum delay spread of a channel between the OFDM symbols in order to prevent interference between the OFDM symbols.

The guard interval longer than the maximum delay spread is also added. Accordingly, a signal period is a sum of a valid symbol period and a guard interval, and the receiver eliminates the guard interval, receives the data of the valid symbol period, and demodulates the received data. A signal of a last period of the valid symbol period is copied to be added in the guard interval for the purpose of protecting from destruction of the orthogonality generated by the delay of the subchannel, which is referred to as the cyclic prefix.

That is, the CP is added to the data signal of the OFDM symbols in parallel, and the parallel/series converter 90 converts the data signal into a serial signal. The serial signal is converted into an analog signal, filtered, and transmitted to a receiver through an RF terminal.

A method for allocating the subcarrier according to the exemplary embodiment of the present invention will be now described with reference to the above configuration.

Conventionally, the transmission data of the first subchannel and the transmission data of the second subchannel are respectively buffered and arranged in the respective OFDM symbols, the arranged data is demodulated according to the modulation methods such as the QPSK, 16 QAM, and 64 QAM, and therefore the subcarrier allocation is performed. However, in the exemplary embodiment of the present invention, for the purpose of preventing the delay corresponding to the symbols to which the subcarriers are allocated when the subcarriers are allocated to the data of the second subchannel, the subcarriers are allocated to the transmission data of the first subchannel after the modulation mapping operation begins. However, the subcarriers are allocated to the transmission data of the second subchannel before the modulation mapping operation is performed. Accordingly, the first carrier allocator 20 which is a subcarrier allocator includes a symbol axis subchannel RAM required to convert the symbol axis subchannel data of a data burst type into the OFDM symbol.

The subcarriers are allocated to the data of the second subchannel with reference to a data unit formed before and after the modulation mapping operation before the modulation mapping operation is performed by the first carrier allocator 20. The subcarrier allocation method will be now described.

FIG. 2 shows a diagram for exemplifying symbols of the second subchannel, and the respective subchannels including 6 symbols in the OFDM system. In FIG. 2, the horizontal axis is the time axis, and the vertical axis is the frequency axis.

As shown in FIG. 2, the frequency axis is divided into 12 bands, and each band includes 16 bins. The respective bins include 8 data signals and a pilot signal. One bin is allocated to each OFDM symbol, the 6 OFDM symbols form a subchannel, and therefore the 48 data are mixed according to a subcarrier allocation algorithm. When a subchannel has an OFDM symbol in a like manner of the frequency domain subchannel (the first subchannel), data are stored in a buffer and are read in sequence according to an address generated by the subcarrier allocation algorithm.

At this time, the delay of one OFDM symbol is generated. However, as shown in FIG. 2, the symbol axis subchannel (the second subchannel) includes 6 OFDM symbols, and therefore the delay of 6 symbols is generated when the subcarriers are allocated after the modulation mapping operation is performed for the data of the second subchannel.

The subcarriers are allocated before the modulation mapping operation is performed for the data of symbol axis subchannel, and the subcarrier-allocated data of the symbol axis subchannel are buffered in one symbol period allocating the subcarriers to the data of the frequency domain subchannel after the modulation mapping operation is performed.

Accordingly, the delay is apparently reduced compared to the prior art in which the subcarriers are concurrently allocated to the symbol axis subchannel and the frequency domain subchannel.

FIG. 3 shows a flowchart for representing a subcarrier allocation process according to the exemplary embodiment of the present invention.

As shown in FIG. 1 and FIG. 3, the burst-based transmission data to be transmitted are classified into the respective first and second subchannel data, and input to the first buffer unit 10 and the first carrier allocator 20 in step S100.

The first buffer unit 10 temporarily stores the data of the first subchannel and outputs the data to the multiplexer 30. The controller 22 of the first carrier allocator 20 stores the data of the second subchannel in the RAM 21, reads the data stored in the RAM 21 in an order according to the predetermined carrier allocation algorithm, and allocates the subcarriers. At this time, the controller 22 varies processing bits of the data inputted according to the modulation method.

A process for allocating the subcarrier to the second subchannel will now be exemplified.

FIG. 4 shows a diagram for representing the process for allocating the subcarrier when one subchannel of the symbol axis subchannels includes 48 data, based on the diagram in FIG. 2. In FIG. 4, oblique-lined areas indicate locations of the pilot signals.

It is assumed that one subchannel of the symbol axis subchannel includes the 48 data as shown in (a) of FIG. 4, and the subcarriers are allocated to the 48 data as shown in (b) of FIG. 4. As shown in (a) and (b) of FIG. 4, a 0th data is mapped onto a 15th subcarrier and a 1st data is mapped onto a 33rd subcarrier.

The controller 22 of the first subcarrier allocator 20 generates an inverse address of (b) of FIG. 4 when the controller 22 allocates the subcarriers as shown in (b) of FIG. 4 while reading the data stored in the RAM 21, which is shown in (c) of FIG. 4.

As shown in (b) of FIG. 4, a 0th subcarrier is stored in a location of a 47th data. Accordingly, an address for reading the 47th data to allocate a 0th subcarrier, reading a 31st data to allocate a 1st subcarrier, and reading a 39th data to allocate a 2nd subcarrier is generated to read the corresponding data from the RAM 21 and allocate the subcarriers. That is, subcarriers are allocated by reading the data stored in the RAM 21 in the order of the carrier allocation algorithm.

The case (c) of FIG. 4 shows a case of the QPSK modulation method in which a 1 bit is mapped onto a 1 modulation symbol. Therefore, a number of data allocated to one subcarrier is varied in the 16 QAM modulation method in which two bits are mapped onto the 1 modulation symbol, and the 64 QAM modulation method in which 3 bits are mapped into the 1 modulation symbol. In the 16 and 64 QAM modulation methods, 96 and 144 data are respectively mapped onto 48 modulation symbols, and therefore an address for reading the data from the RAM 21 is to be generated according to the modulation method.

The case (d) of FIG. 4 shows an order for reading the data from the RAM in the 16 QAM modulation method, and the case (e) of FIG. 4 shows an order for reading the data from the RAM in the 64 QAM modulation method.

Two data are read to allocate one subcarrier in the case of the 16 QAM modulation method, and three data are read to allocate one subcarrier in the case of the 64 QAM modulation method. That is, one subchannel includes 96 bits in the 16 QAM modulation method as shown in (d) of FIG. 4, and therefore 94th and 95th input bits corresponding to the 47th signal are allocated to the 0th subcarrier according to the subcarrier allocation algorithm. The two input bits are read and mapped onto one modulation symbol.

In addition, since one subchannel includes 144 input bits in the 64 QAM modulation method as shown in (e) of FIG. 4, 141st, 142nd, and 143rd input bits corresponding to the 47th signal are read, and the three bits are mapped into one modulation symbol.

Accordingly, when an order of the data is defied as $$amc\_rsub(i) i=0, \ldots 47$$

in the case of the QPSK modulation method as shown in (c) of FIG. 4, two data (in the case of the 16 QAM) and three data (in the case of the 64 QAM) are processed in one subcarrier as given in Math figure 1 when the modulation is the 16 and 64 QAM modulation method.

MathFigure 1

$$amc\_rsub(i) \times 2, amc\_rsub(i) \times 2+1 \; i=0, \ldots 47$$

$$amc\_rsub(i) \times 2, amc\_rsub(i) \times 2+1, amc\_rsub(i) \times 2+2 \; i=0, \ldots 47$$

As described, the subcarrier allocation is performed before the modulation mapping operation is performed, and therefore the subcarrier allocation is performed while the number of input bits for allocating the subcarriers is differentiated according to the modulation method.

Accordingly, as shown in FIG. 3, a modulation method is determined with reference to information from the modulation mapper 40 in step S110 before the subcarrier is allocated to the data of the second subchannel. A data bit number for allocating the subcarrier is determined according to the determined modulation method, and the data stored in the RAM 21 according to the predetermined carrier algorithm are read the determined bit number of times so as to map the data onto one modulation symbol in step S120.

The subcarrier-allocated data of the second subchannel are modulated by the modulation mapper 40 and stored in the second buffer unit 60. The data of the first subchannel are modulated by the modulation mapper 40 and the subcarriers are allocated to the data of the first subchannel by the second frequency allocator 50 in respective steps S130 and S140.

The data of the first and second subchannels from the second frequency allocator 50 and the second buffer 60 are input to the IFFT unit 70, and transformed into the time domain signals, and outputted as OFDM symbols in step S150. The CP is added to the OFDM symbol-based data, and the data are transmitted after undergoing a conventional transmission process in step S160.

The receiver processes the signal transmitted as described above. The process of the receiver will be omitted because it is a publicly known art.

According to the exemplary embodiment of the present invention, when the subchannels formed on the time domain which is the symbol axis coexist with the subchannels formed on the frequency domain in one frame, the subcarriers are allocated in the buffer for converting the data input before the modulation mapping operation is performed according to a modulation method in the OFDM system. Therefore no delay is generated in the subchannels formed on the symbol axis.

In addition, the delay of N symbols is prevented without using any additional hardware for eliminating the delay generated when the subcarriers are allocated to the subchannel formed on the symbol axis.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

The invention claimed is:

1. A method for allocating subcarriers in an orthogonal frequency division multiplex (OFDM) system, the method comprising:
   a) classifying transmission data into data of a first subchannel formed on a frequency domain and data of a second subchannel formed on a symbol axis;
   b) allocating first subcarriers to the data of the second subchannel;
   c) mapping the data of the first subchannel and the first subcarrier-allocated data of the second subchannel according to respective modulation methods; and
   d) allocating second subcarriers to the modulation-mapped data of the first subchannel.

2. The method of claim 1, further comprising:
   in b),
   determining a modulation method;
   determining a number of data bits for allocating the second subcarriers according to the modulation method; and
   mapping the determined bit number of the data onto one modulation symbol and allocating the second subcarriers to the mapped data.

3. The method of claim 1 or 2, wherein the first subcarriers are allocated to the data of the second subchannel, and the data of the first subchannel are buffered for performing a demodulation mapping operation in b); and
   the second subcarriers are allocated to the data of the first subchannel, and the data of the second subchannel are buffered for respectively converting into symbols in d).

4. The method of claim 1, further comprising performing an inverse fast Fourier transform of the modulated and subcarrier allocated data of the first subchannel and the second subchannel, and outputting the OFDM symbol-based data.

5. The method of claim 2, further comprising
   performing an inverse fast Fourier transform of the modulated and subcarrier-allocated allocated data of the first subchannel and the second subchannel, and outputting the OFDM symbol-based data.

6. A transmitter of an orthogonal frequency division multiplex (OFDM) system comprising:
   a first carrier allocator for receiving first data of a second subchannel formed on a symbol axis and allocating first subcarriers to the first data;
   a modulation mapper for mapping the first subcarrier-allocated first data according to a modulation method;
   a second carrier allocator for allocating second subcarriers to second data of a first subchannel formed on a frequency domain including the modulation-mapped data;
   an inverse fast Fourier transform unit for performing an inverse fast Fourier transform of demodulated first data and the second subcarrier-allocated data, and outputting the OFDM symbol-based data; and
   a transmission unit for adding a cyclic prefix to the OFDM symbol based first data and second subcarrier-allocated data, and transmitting the data.

7. The transmitter of claim 6, further comprising:
   a first buffer for buffering the second data of a subchannel formed on a frequency domain;
   wherein the first buffer is provided in an input part of the modulation mapper, and the second carrier allocator is provided between the modulation mapper and the inverse fast Fourier transform unit.

8. The transmitter of claim 7, further comprising
   a second buffer for buffering the first data outputted from the modulation mapper, and outputting the buffered data to the inverse fast Fourier transform unit.

9. The transmitter of claim 6, wherein the first carrier allocator comprises:
   a RAM for storing the first data in sequence; and
   a controller for outputting the first data stored in the RAM according to a predetermined allocation algorithm, and mapping the data onto a modulation symbol.

10. The transmitter of claim 9, wherein the controller determines a modulation method of the modulation mapper, determines a number of data bits for allocating the second subcarriers, and maps the determined number of the data onto one modulation symbol.

* * * * *